(12) United States Patent
Tan et al.

(10) Patent No.: US 11,256,889 B2
(45) Date of Patent: *Feb. 22, 2022

(54) ILLUMINATION ASSEMBLIES FOR USE IN BARCODE READERS AND DEVICES AND METHODS ASSOCIATED THEREWITH

(71) Applicant: ZEBRA TECHNOLOGIES CORPORATION, Lincolnshire, IL (US)

(72) Inventors: Chinh Tan, East Setauket, NY (US); Caihua Chen, Cupertino, CA (US); Carl D. Wittenberg, Water Mill, NY (US); Jason Y. Potter, New York, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,750

(22) Filed: Oct. 26, 2020

(65) Prior Publication Data

US 2021/0042484 A1  Feb. 11, 2021

Related U.S. Application Data

(63) Continuation of application No. 16/373,232, filed on Apr. 2, 2019, now Pat. No. 10,817,687, which is a continuation of application No. 15/952,786, filed on Apr. 13, 2018, now Pat. No. 10,268,854.

(51) Int. Cl.
*G06K 7/10* (2006.01)

(52) U.S. Cl.
CPC ....... *G06K 7/10732* (2013.01); *G06K 7/1096* (2013.01); *G06K 7/10831* (2013.01); *G06K 7/10881* (2013.01)

(58) Field of Classification Search
CPC .......... G06K 7/10732; G06K 7/10881; G06K 7/10831; G06K 7/10801; G06K 7/10821; G06K 7/1096; G06K 7/10574; G06K 7/10811; G06K 7/10584
USPC ...................................... 235/462.01, 462.42
See application file for complete search history.

(56) References Cited

U.S. PATENT DOCUMENTS

| | | | | |
|---|---|---|---|---|
| 8,450,708 B2* | 5/2013 | Liu | ................... | G06K 7/10831 250/566 |
| 2002/0148901 A1* | 10/2002 | Barkan | .............. | G06K 7/10881 235/462.43 |
| 2009/0059616 A1* | 3/2009 | Wittenberg | ............ | G02B 5/021 362/558 |

* cited by examiner

*Primary Examiner* — Tuyen K Vo
(74) *Attorney, Agent, or Firm* — Yuri Astvatsaturov

(57) ABSTRACT

At least some embodiments of the present invention are directed toward optical arrangements for use in providing illumination light emitted by a barcode reader. In some embodiments, the arrangement includes an illumination source, a lens positioned within the path of the illumination light emitted by the illumination source where the lens is operable to collimate the light and redirect its central axis, and a window positioned within the path of the redirected and collimated light where the window is operable to alter the illumination light such that the resulting illumination light beam has a height-to-width ratio of less than 8 to 25.

22 Claims, 16 Drawing Sheets

ILLUMINATION ASSEMBLIES FOR USE IN BARCODE READERS AND DEVICES AND METHODS ASSOCIATED THEREWITH

CROSS-REFERENCE TO RELATED APPLICATIONS

This application is a continuation of U.S. patent application Ser. No. 16/373,232 filed on Apr. 2, 2019, which is a continuation of U.S. patent application Ser. No. 15/952,786 filed on Apr. 13, 2018, both of which are incorporated herein by reference in their entirety.

BACKGROUND

One-dimensional and two-dimensional symbols, such as barcodes, are commonly used to identify articles/items/goods that they are attached to. To decode barcodes, barcode readers are used either by individual operators or autonomously whereby the readers scan, decode, and transmit barcode data to appropriate computer devices. Generally, these barcode readers include components like an image capture component for optically capturing image data, an aiming light component to help aim the reader in a desired direction, and an illumination component to provide sufficient light for proper data capture. Additionally, in applications like hand-held use, the aforementioned components must be tightly packaged in a form factor that is appropriate for the specific use. This creates the need for continued development of barcode reader components in order to enable complementary functionality.

SUMMARY

In an embodiment, the present invention is an illumination assembly for use in a barcode reader. The illumination assembly includes: an illumination source operable to emit an illumination light along a first path, the illumination light having a central axis; a lens positioned within the first path of the illumination light, the lens configured to redirect the central axis resulting in a redirected central axis and propagate the illumination light along a second path, the central axis and the redirected central axis being non-parallel with respect to each other, the redirected central axis defining a line of intersection between a first plane and a second plane, the first plane being perpendicular to the second plane, the lens including a first lens surface proximal to the illumination source, the first lens surface being positioned within the first path and being defined by a first freeform polynomial, the lens further including a second lens surface distal to the illumination source, the second lens surface being positioned within the second path and being defined by a second freeform polynomial; and a window positioned within the second path of the illumination light, the window including a first window-portion and a second window-portion, the first window-portion being configured to propagate a first portion of the illumination light along a third path, the first portion of the illumination light being a portion of the illumination light that impinges on the first window-portion, the third path having a divergence angle of at least 25 degrees along the first plane and a divergence angle of at most 8 degrees along the second plane, the second window-portion configured to propagate a second portion of the illumination light along a fourth path, the second portion of the illumination light being a portion of the illumination light that impinges on the second window-portion, the fourth path having a divergence angle of at most 20 degrees along the first plane and a divergence angle of at most 8 degrees along the second plane.

In another embodiment, the present invention is an illumination assembly for use in a barcode reader. The illumination assembly includes: an illumination source operable to emit an illumination light along a first path, the illumination light having a central axis; and a lens positioned within the first path of the illumination light, the lens configured to redirect the central axis resulting in a redirected central axis and propagate the illumination light along a second path, the central axis and the redirected central axis being non-parallel with respect to each other, the redirected central axis defining a line of intersection between a first plane and a second plane, the first plane being perpendicular to the second plane, the lens including a first lens surface proximal to the illumination source, the first lens surface being positioned within the first path and being defined by a first freeform polynomial, the lens further including a second lens surface distal to the illumination source, the second lens surface being positioned within the second path and being defined by a second freeform polynomial, wherein the first lens surface and the second lens surface are arranged such that a first tangential plane that is tangential to the first lens surface along the central axis and a second tangential plane that is tangential to the second lens surface along the redirected central axis intersect at an oblique angle.

In still another embodiment, the present invention is a method of illuminating a target to be read by a barcode reader. The method includes: providing an illumination source operable to emit an illumination light along a first path, the illumination light having a central axis; passing the illumination light through a lens positioned within the first path of the illumination light, the lens configured to redirect the central axis resulting in a redirected central axis and propagate the illumination light along a second path, the central axis and the redirected central axis being non-parallel with respect to each other, the redirected central axis defining a line of intersection between a first plane and a second plane, the first plane being perpendicular to the second plane, the lens including a first lens surface proximal to the illumination source, the first lens surface being positioned within the first path and being defined by a first freeform polynomial, the lens further including a second lens surface distal to the illumination source, the second lens surface being positioned within the second path and being defined by a second freeform polynomial; and upon the operation of passing the illumination light through the lens, passing the illumination light through a window positioned within the second path of the illumination light, the window including a first window-portion and a second window-portion, the first window-portion being configured to propagate a first portion of the illumination light along a third path, the first portion of the illumination light being a portion of the illumination light that impinges on the first window-portion, the third path having a divergence angle of at least 25 degrees along the first plane and a divergence angle of at most 8 degrees along the second plane, the second window-portion configured to propagate a second portion of the illumination light along a fourth path, the second portion of the illumination light being a portion of the illumination light that impinges on the second window-portion, the fourth path having a divergence angle of at most 20 degrees along the first plane and a divergence angle of at most 8 degrees along the second plane.

These and other features, aspects, and advantages of the present disclosure will become better-understood with reference to the following drawings, description, and any claims that may follow.

DRAWINGS

Figure 1:
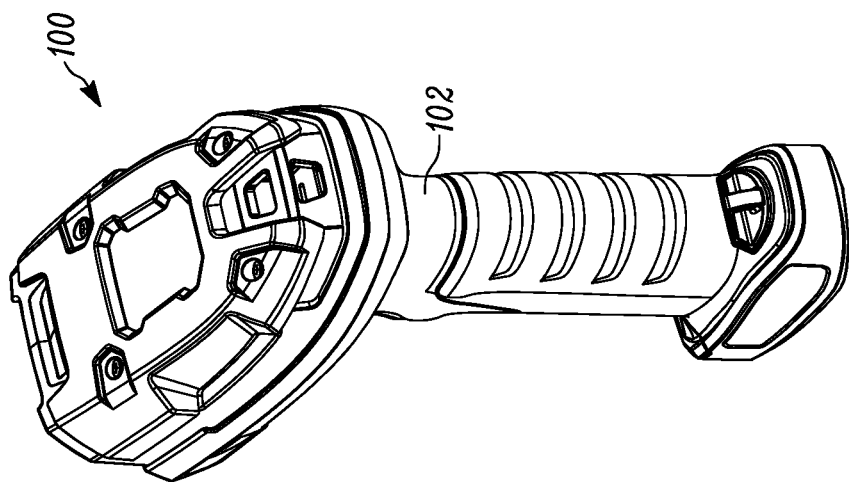
FIG. 1 illustrates front and rear perspective views of a barcode reader, in accordance with an embodiment of the present invention.
Figure 1:
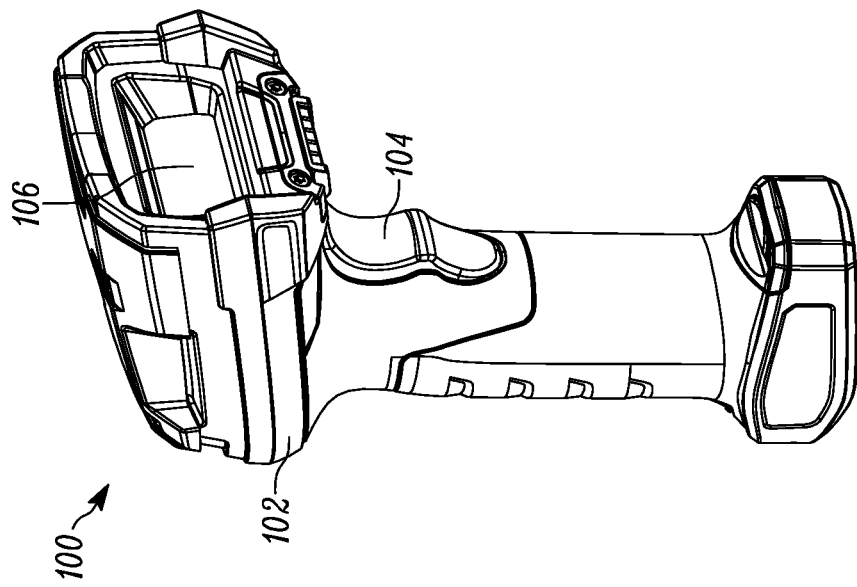

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring to FIG. 1, shown therein is an exemplary barcode reader 100 having a housing 102 with a cavity for housing internal components, a trigger 104, and a housing window 106. The barcode reader 100 can be used in a hands-free mode as a stationary workstation when it is placed on the countertop in a supporting cradle (not shown). The barcode reader 100 can also be used in a handheld mode when it is picked up off the countertop (or any other surface) and held in an operator's hand. In the hands-free mode, products can be slid, swiped past, or presented to the window 106. In the handheld mode, the barcode reader 100 can be aimed at a barcode on a product, and the trigger 104 can be manually depressed to initiate imaging of the barcode. In some implementations, the supporting cradle can be omitted, and the housing 102 can also be in other handheld or non-handheld shapes.

Figure 2:
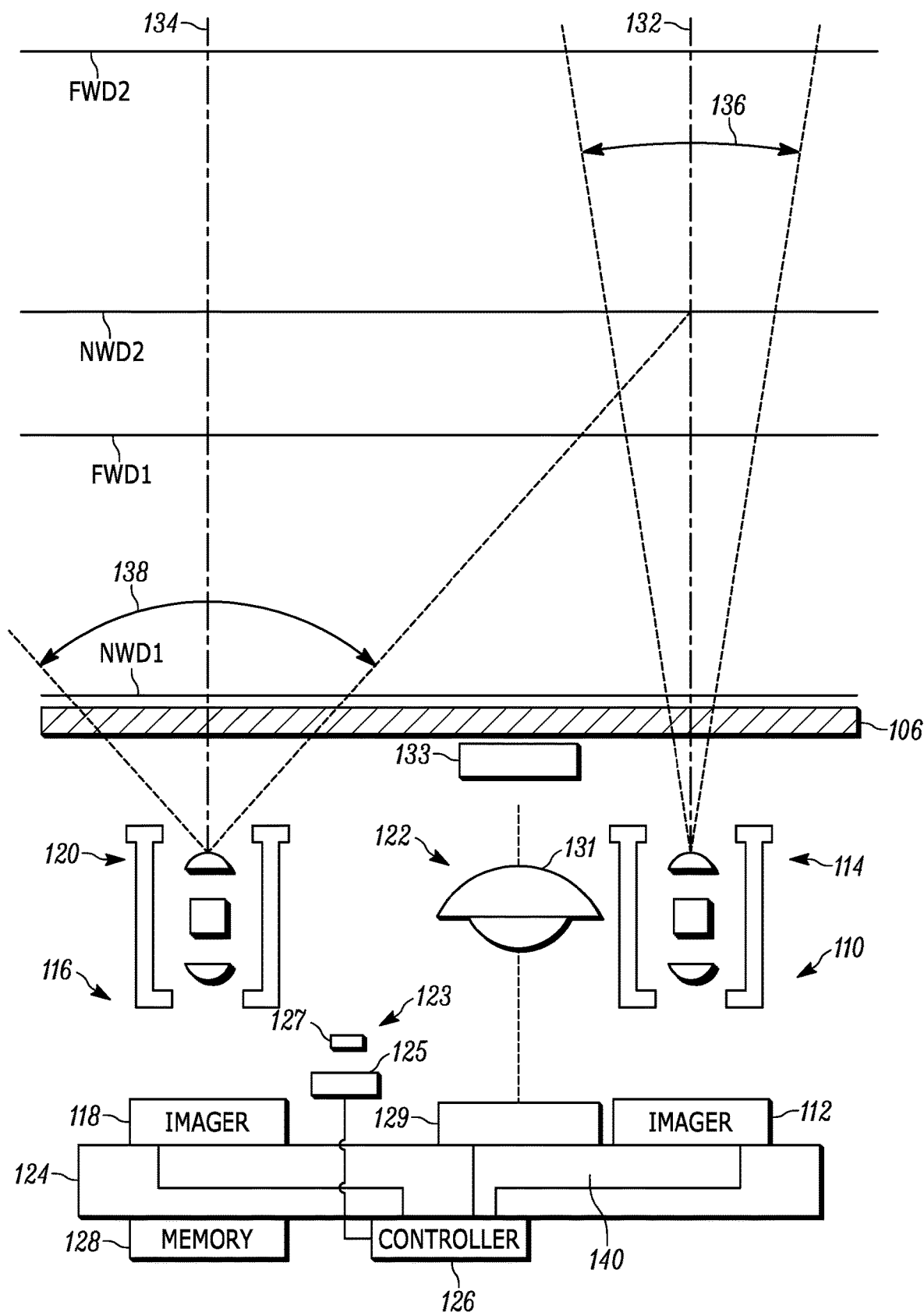
FIG. 2 illustrates a block schematic diagram of a portion of a barcode reader, in accordance with an embodiment of the present invention.

FIG. 2 illustrates a block schematic diagram of a portion of a barcode reader 100 in accordance with some embodiments. It should be understood that FIG. 2 is not drawn to scale. The barcode reader 100 in FIG. 2 includes the following components: (1) a first imaging assembly 110 that includes a first linear imaging sensor 112 and a first lens assembly 114; (2) a second imaging assembly 116 that includes a second linear imaging sensor 118 and a second lens assembly 120; (3) an illumination assembly 122 including an illumination source 129, an illumination lens 131, and a window 133 that includes multiple sections designed to propagate light in different ways; (4) an aiming light assembly 123 having an aiming light source 125 and an aiming lens assembly 127 (also referred to as an aiming beam shaper); (5) a printed circuit board (PCB) 124 supporting the first and second linear imaging sensors 112, 118, and the illumination source 129; (6) a controller 126 positioned on the PCB 124 and communicatively coupled to the first and second linear imaging sensors 112, 118, and the illumination source 129; and (7) a memory 128 connected to the controller 126. In referring to portions of the barcode reader, certain components may be grouped and referred to as an "imaging engine." In some instances, the imaging engine can be said to include image capture components like the image sensor(s). In other instances, the imaging engine can be said to include additional elements such as, for example, an aiming light assembly and/or the illumination assembly.

The first and second linear imaging sensors 112, 118 can be either CCD or CMOS linear imaging sensors that generally include multiple photosensitive pixel elements aligned in one-dimensional array. The first and second linear imaging sensors 112, 118 are operative to detect light captured, respectively, by the first and second lens assemblies 114, 120 along a respective optical path or axis 132, 134 through the window 106. Generally, each respective linear imaging sensor and imaging lens assembly pair is designed to operate together for capturing light scattered, reflected, or emitted from a barcode as pixel data over a one-dimensional field of view (FOV) extending along a respective linear FOV plane. However, each lens/imaging sensor pair (also referred to as an optical assembly) is configured with different parameters.

In the currently described embodiment, the first imaging assembly 110 is designed to read barcodes over a relatively far working distance range that extends between FWD1 and FWD2. In some embodiments, FWD1 is approximately 24 inches from the window 106 and FWD2 is approximately 600 to 680 inches from the window 106. In some embodiments, FWD2 extends beyond 680 inches. Additionally, imaging assembly 110 captures light from a relatively narrow FOV 136. On the other hand, the second optical assembly 116 is designed to read barcodes over a relatively near working distance range that extends between NWD1 and NWD2. In some embodiments, NWD1 is approximately 0 inches from the window 106 and NWD2 is approximately 28 to 32 inches from the window 106. Additionally, imaging assembly 116 captures light from a relatively wider FOV 138.

Figure 3A:
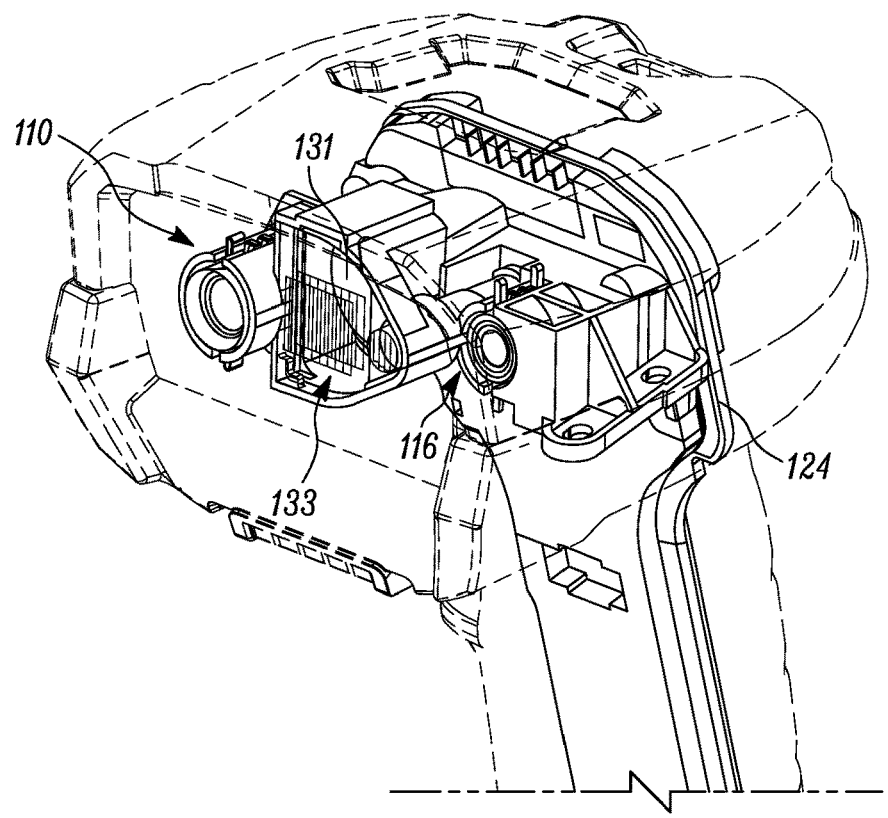
FIG. 3A illustrates a perspective view of some components a barcode reader, in accordance with an embodiment of the present invention.
Figure 3B:
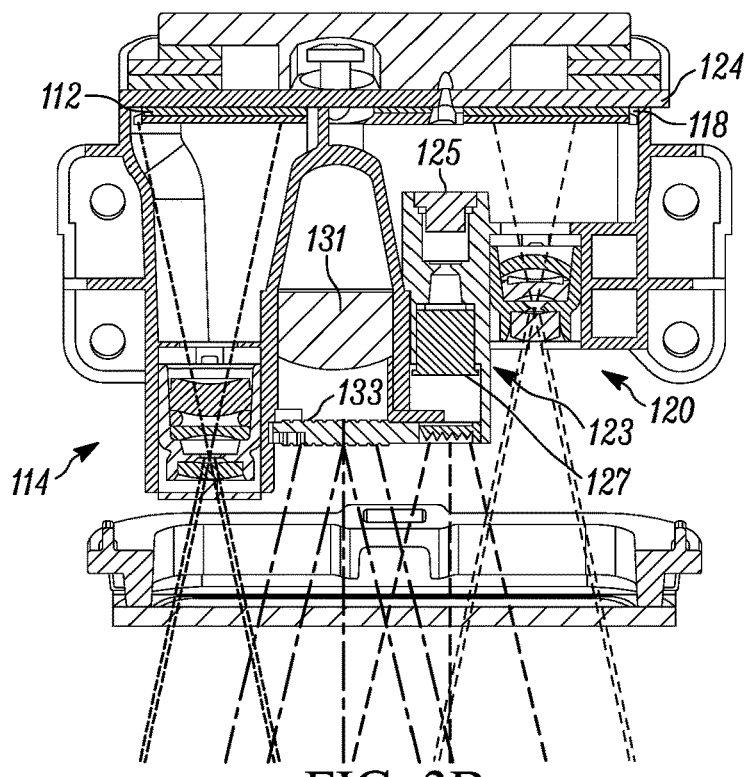
FIG. 3B illustrates a top cross-section view of the components of FIG. 3A.

An example of the component arrangement of FIG. 2 is illustratively shown in a perspective view of FIG. 3A and the top cut-away view of FIG. 3B which show some components of the reader 100 in a partially assembled form. In this embodiment, the illumination assembly is positioned between the first imaging assembly and the second imaging assembly. In a preferred configuration, the illumination assembly is positioned closer to the first (far) imaging assembly than the second imaging (near) imaging assembly. Additionally, in the embodiment shown in FIGS. 3A and 3B, the first linear imaging sensor 112 and the second linear imaging sensor 118 are positioned on a substrate (such as a PCB 124) such that a distance between the first linear imaging sensor 112 and the first lens assembly 114 is different from a distance between the second linear imaging sensor 118 and the second lens assembly 120. Furthermore, the imaging assemblies and the aiming assembly can be situated such that their respective fields of view (which may be arranged to be coplanar) and the respective planes along which they extend form an oblique angle relative to a PCB plane that is defined by the lengthwise and widthwise directions of the PCB 124.

Figure 4:
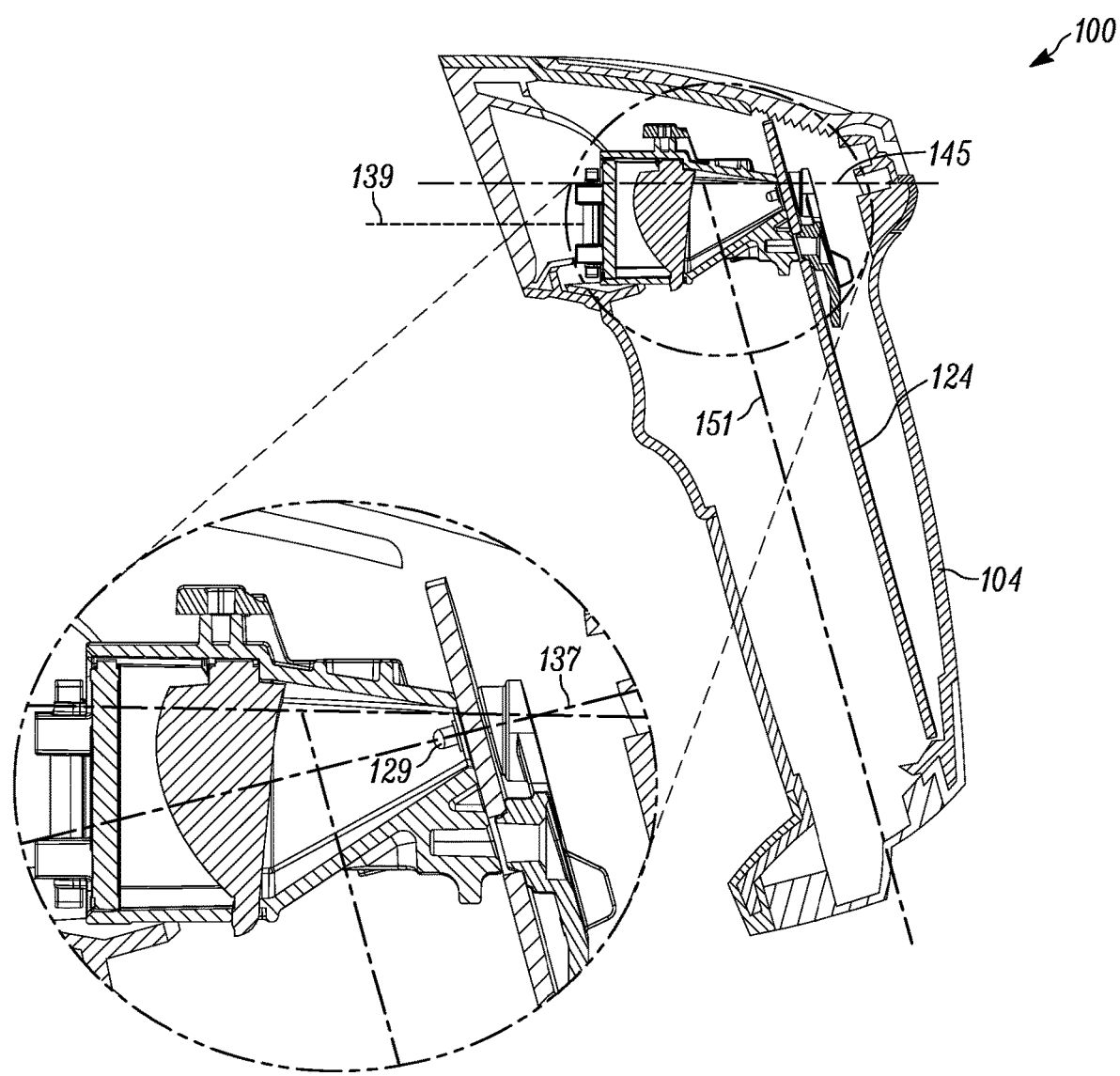
FIG. 4 illustrates a side cross-section view of some components a barcode reader, in accordance with an embodiment of the present invention.

A better view of this angled arrangement can be seen in FIG. 4 which illustrates a cross-sectional side view of the reader 100. As could be seen in this drawing, the illumination source 129 is provided on the circuit board 124 that extends into the handle 104 at the same angle as the handle 104. In a preferred embodiment, the angle between the circuit board 124 and a central head axis 145 (that in case of the reader using linear imager(s) is parallel with the FOV plane 139) is between 70 and 80 degrees, and preferably about 75 degrees, which corresponds to a preferred ergonomic design for a reader user to hold and aim the reader 100. As a result of this configuration, the illumination source 129, along with its central illumination axis 137, is pointed in a downward direction relative to the reader's fields of view. Maintaining such light directionality could result in diminished performance as appropriate levels of illumination may not reach the desired target, especially at the far reaches of the reader's operable range. This issue can be addressed by implementing certain optical elements within the illumination assembly to redirect the illumination light and further alter its beam characteristics to better suit preferred applications.

FIGS. 5A-6B illustrate an embodiment of an optical element arrangement 200 that may be implemented in the illumination assemblies and barcode readers, such as those that are disclosed herein. The arrangement 200 includes a lens 202 and a window 204 both situated within the path of the illumination light emitted by the illumination source 206, illustrated in this case as a light emitting diode (LED), which is positioned on a PCB 208. This arrangement may be used in combination with the imaging and aiming components described previously, whereby the illumination assembly is configured to illuminate targets positioned within one or more FOV 210 that extends along a FOV plane 212. Additionally, it should be understood that the window 204 does not have to, but could be, formed as part of the overall housing window. In other words, a barcode reader using the arrangement 200 may have additional windows positioned (like the housing window 106) within the path of the illumination light.

Figure 5A:
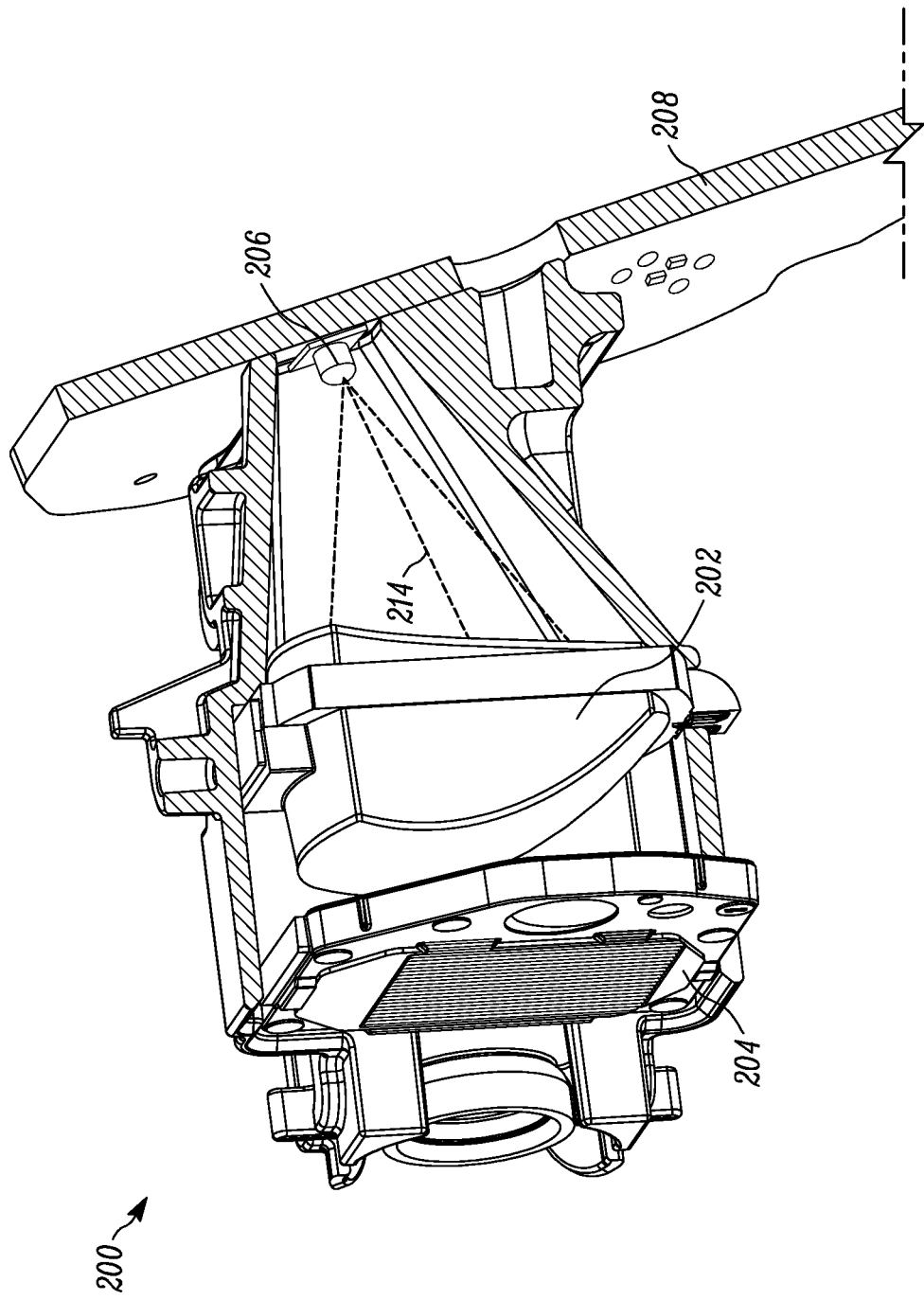
FIG. 5A illustrates a front-perspective cross-section view of an optical arrangement for use in an illumination assembly, in accordance with an embodiment of the present invention.
Figure 5B:
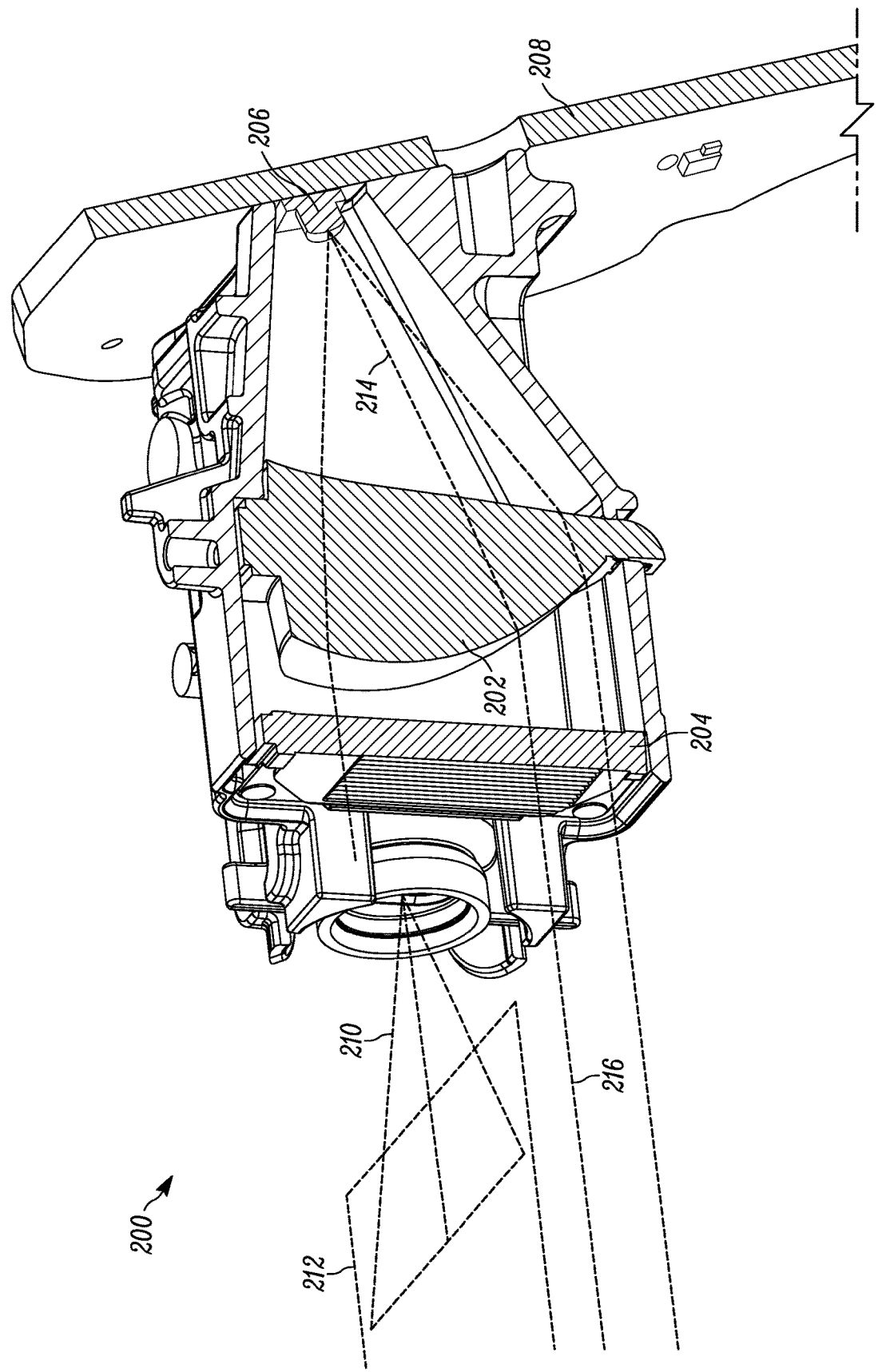
FIG. 5B illustrates a front-perspective partial cross-section view of the optical arrangement of FIG. 5A.
Figure 6A:
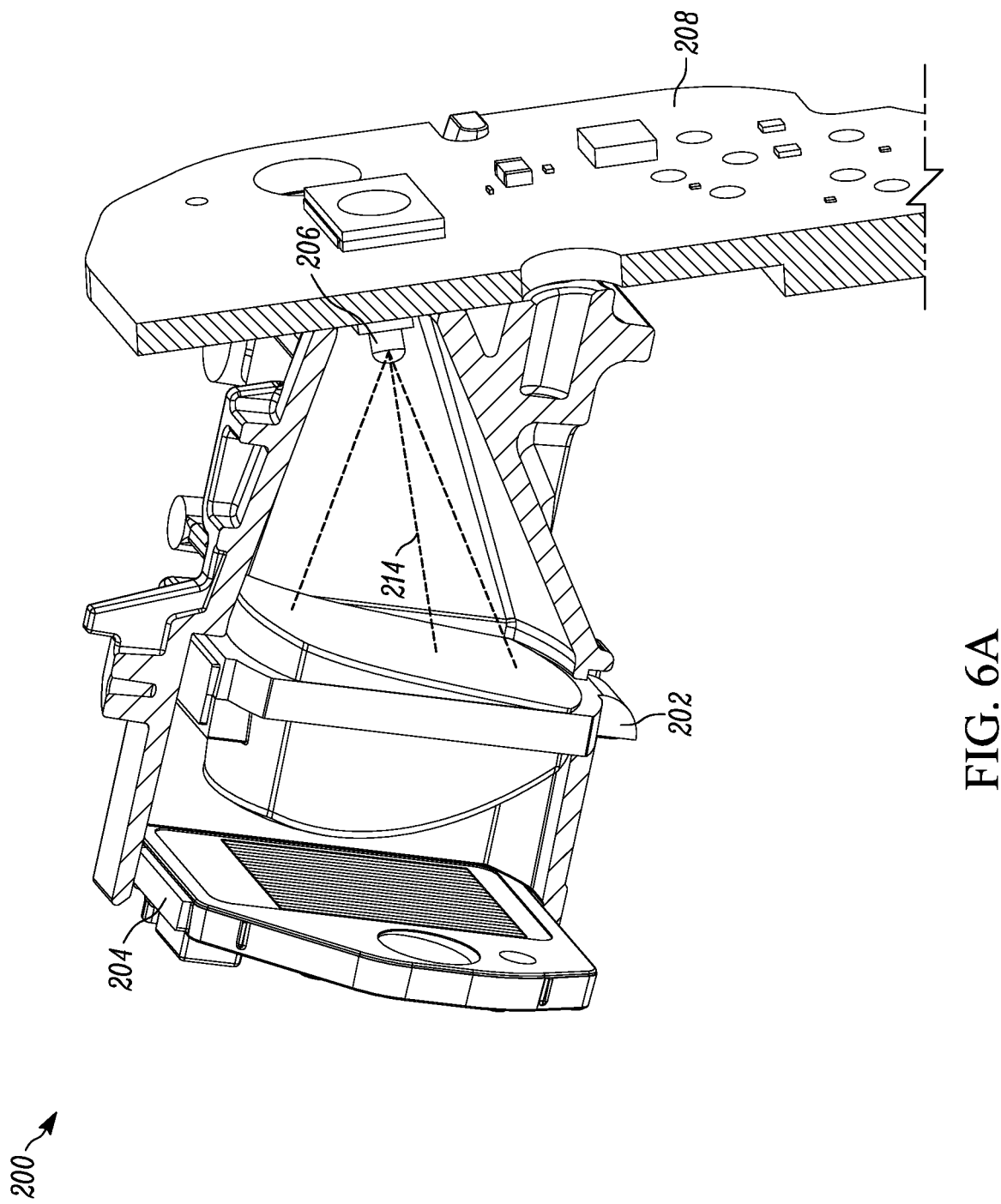
FIG. 6A illustrates a rear-perspective cross-section view of the optical arrangement of FIG. 5A.
Figure 6B:
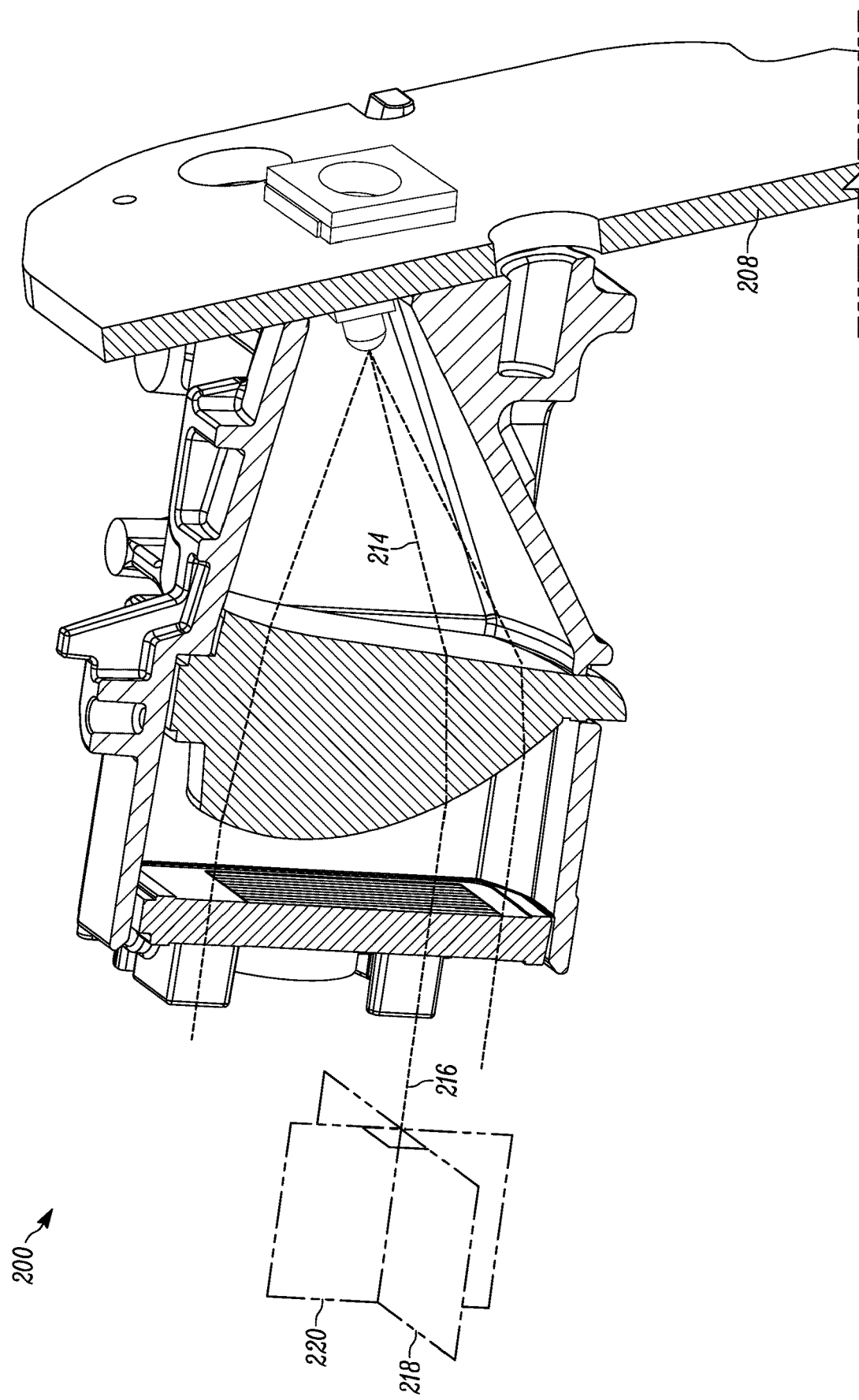
FIG. 6B illustrates a rear-perspective partial cross-section view of the optical arrangement of FIG. 5A.

As can be better seen in the cross-sectional views of FIGS. 5B and 6B, the illumination light has a central axis 214 which, in some embodiments, may be defined the by the axis along which the illumination light has a peak radiant intensity and/or the axis which is normal to the PCB 208 and central to the illumination source 206. Since the central axis 214 is non-parallel to the imaging FOV plane 212, the lens 202 and the window 204 are configured to redirect and shape the emitted illumination light to better illuminate the appropriate target(s). This can be done by positioning the lens 202 within the path of the illumination light emitted by the illumination source 206 such that the lens 202 redirects the central axis 214 to propagate along a more-desired direction. In the illustrated embodiment, the lens 202 redirects the central axis 214 such that the redirected central axis 216 is parallel with and/or overlaps with the imaging FOV 210, and is further non-parallel with the central axis 214. Besides redirecting the central axis 214 of the illumination light, the lens 202 also propagates the illumination light along a new path that varies from the original path. In doing so, the illumination light is collimated to the extent that light leaving the lens 202 has a maximum divergence (may also be referred to as a spread) of 8 degrees in the vertical direction and a maximum divergence of 20 degrees in the horizontal direction. Accordingly, the lens 202 may be referred to as a "collimating lens." In some embodiments, a divergence along the horizontal direction and a divergence along a vertical direction may, respectively, be defined by a divergence along a first plane 218 and a divergence along a second plane 220 where the two planes intersect at a 90-degree angle. Additionally, the line of intersection between the first plane 218 and the second plane 220 may be collinear with the redirected central axis 216. Moreover, the first plane 218 may overlap with the imaging FOV 210, may be parallel with the FOV plane 212, and/or may be coplanar with the FOV plane 212 (i.e., the first plane 218 and the FOV plane 212 are the same plane).

Figure 7A:
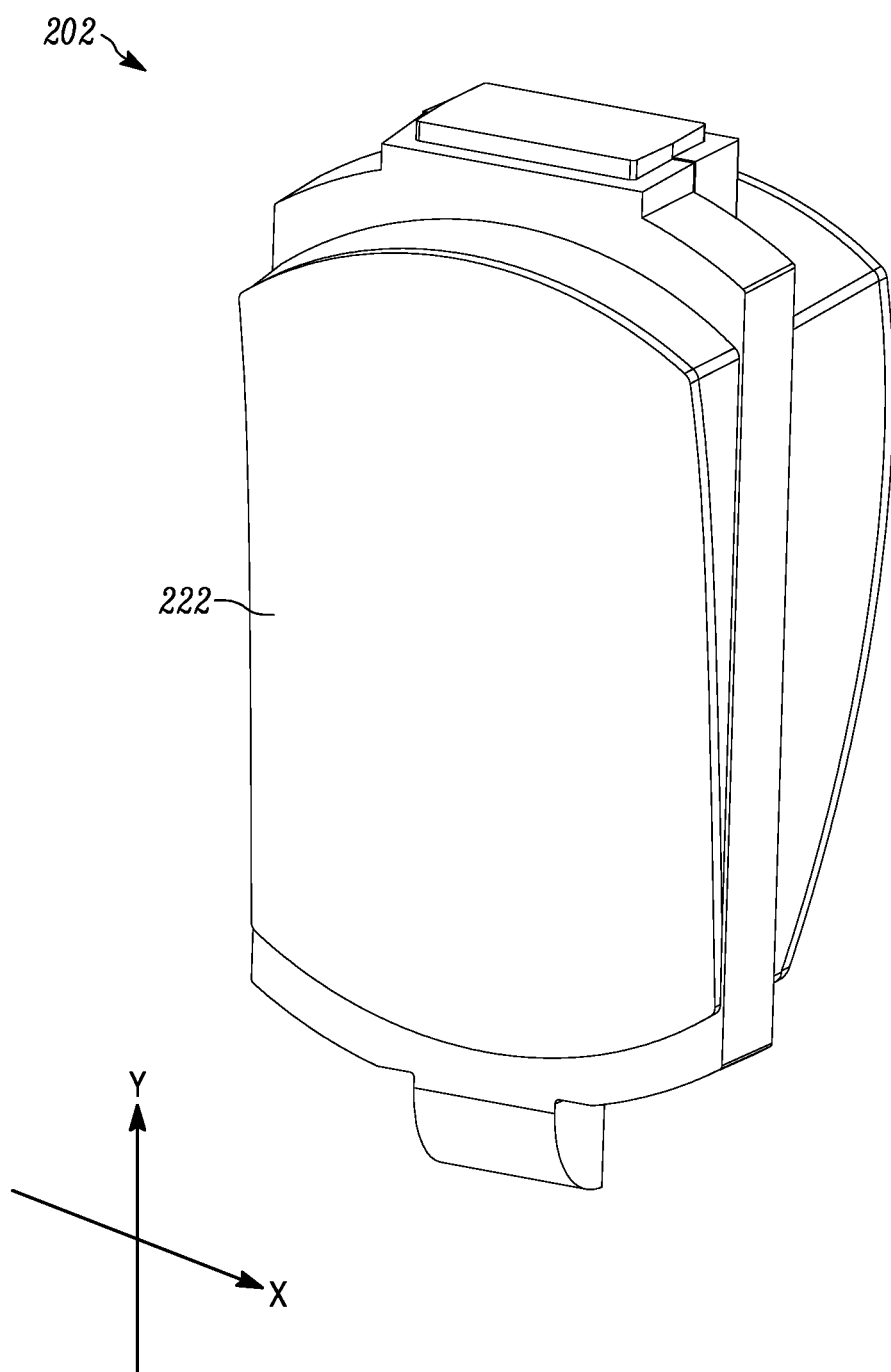
FIGS. 7A and 7B illustrate, respectively, rear and front perspective views of a lens according to an embodiment of the present invention.
Figure 7B:
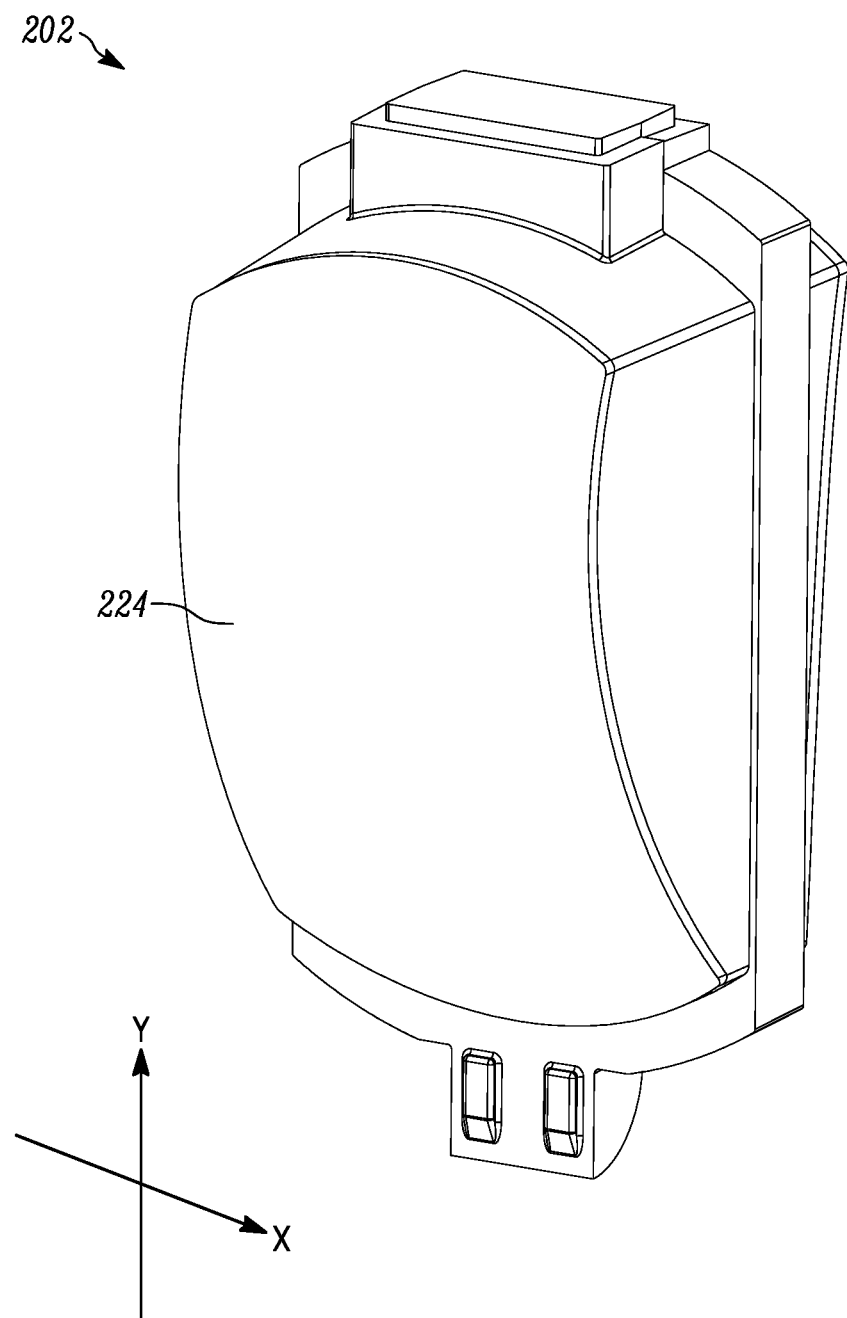

A more detailed view of the lens 202 is provided in FIGS. 7A and 7B. In particular, lens 202 includes a first lens surface 222 that is oriented to be proximal to the illumination source 206 when the lens 202 is positioned in the arrangement 200 and a second lens surface 224 that is oriented to be distal to the illumination source 206 when the lens 202 is positioned in the arrangement 200. Due to this positioning of the lens 202, the first lens surface 222 ends up being within a first path of the illumination light that results from the illumination light being emitted by the illumination light source 206 and the second lens surface 224 ends up being within a second path of the illumination light that results from the lens 202 redirecting the illumination light from its first path. Each of the first surface 222 and the second surface 224 is defined by a respective freeform polynomial. In other words, each of the first and second surfaces has no translational or rotational symmetry about axes normal to the mean plane. In an embodiment, each of the surfaces 222, 224 may be defined by:

$$z(x, y) = \frac{cr^2}{1 + \sqrt{1 - (1 + k)c^2 r^2}} + \sum_{i,j}^{M,N} A_{ij} E_{ij}(x, y)$$

where:
  c is a curvature;
  $r^2$ is a radial coordinate of the surface and is equal to $x^2 + y^2$
  k is the conic constant of the surface;
  M and N are maximum orders of the polynomial;

i and j are running indices indicating the order of the polynomial;

$A_{ij}$ is a coefficient associated with an order of the polynomial;

$E_{ij}$ is the high order polynomial (e.g., of the form $x^i y^j$); and x and y are points on an X/Y coordinate plane that is normal to, and may be centered about, the redirected central axis.

Besides being freeform polynomials, the first 222 and second 224 surfaces are arranged such that they form a wedge shape. In an embodiment, a wedge shape is defined by the presence of an oblique angle between a plane tangential to the first lens surface 222 at the point of the central axis 214 and another plane tangential to the second surface 224 at the point of the redirected central axis 216. In a preferred embodiment, this oblique angle is between 25 and 40 degrees. Additionally, the lens 202 may be configured such that either of the first 222 and second 224 surfaces has a height-to-width ratio, as expressed respectively along the Y and X axis shown in FIGS. 7A and 7B, between 1.25 to 1 and 1.75 to 1.

The design of the lens 202 can be particularly advantageous as it may allow for a simultaneous redirection and concentration of light in a horizontal band. Such illumination patterns can be especially useful when used in connection with linear imaging assemblies designed to capture image data extending along a horizontal direction. Accordingly, in some embodiments the lens 202 may provide an on-axis gain between 25× and 35×. In an embodiment, on-axis gain is referred to a signal gain that is achieved along a respective central axis of the signal.

Figure 8A:
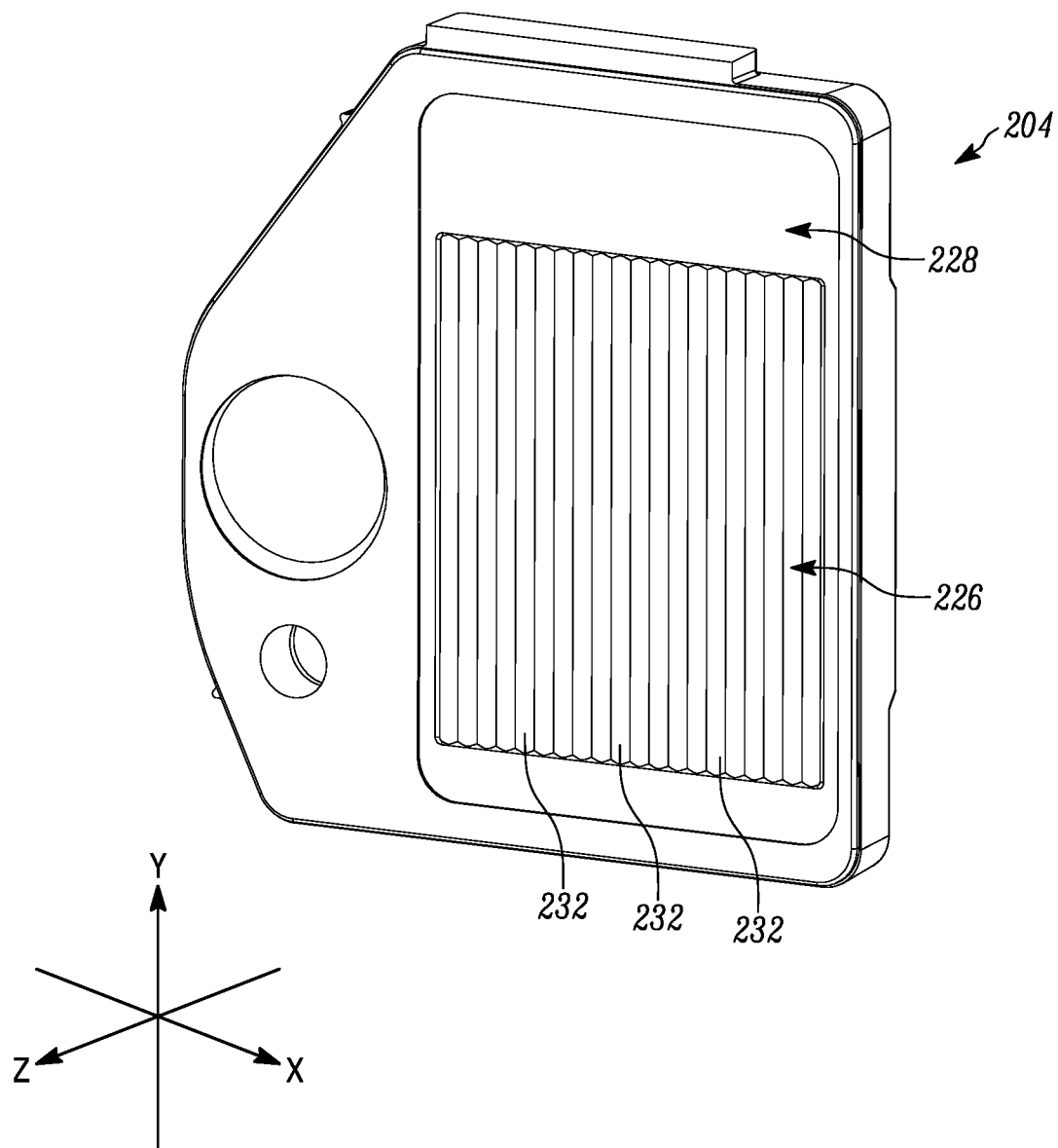
FIGS. 8A and 8B illustrate, respectively, rear and front perspective views of a window according to an embodiment of the present invention.
Figure 8B:
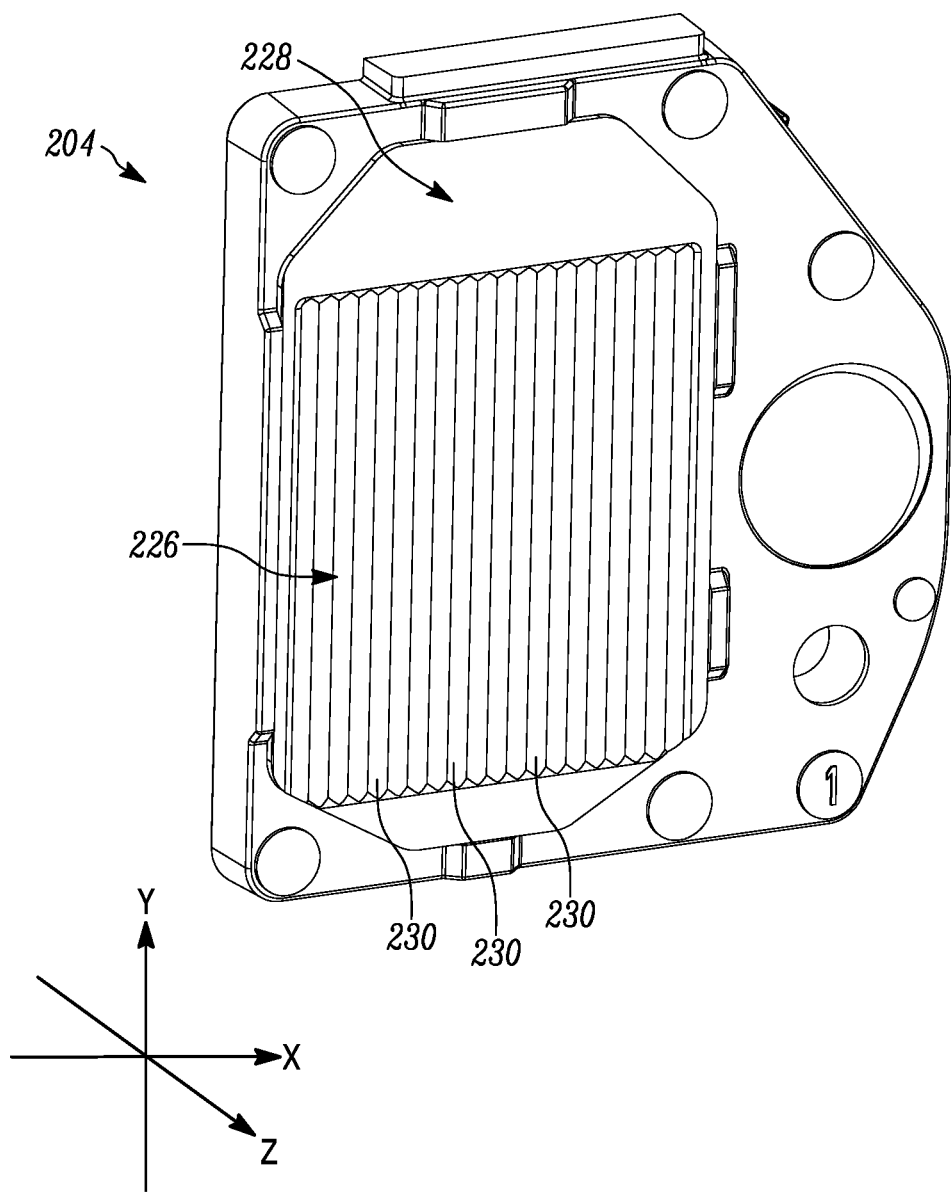
Figure 9:
FIG. 9 illustrates a top-down, partial cross-section view of the window of FIGS. 8A and 8B.

Referring back to FIGS. 5A-6B and FIGS. 8A-8B, once the illumination light has been redirected via the lens 202, it passes through the window 204 that is comprised of a first window-portion 226 and a second window-portion 228. The first window-portion 226 is configured to propagate a certain (e.g., first) portion of the total illumination light along a third path. The portion of the illumination light that is propagated along the third path is generally the portion that impinges on the first window-portion 226. In an embodiment, the first window-portion forms a lens array having a plurality of lens elements. As best seen in the top-down, partial cross-section view of an exemplary lens array in FIG. 9, each lens element can have a first lens-element surface 230 that varies in a first direction (surface positioned measured along the Z axis in the direction of the X axis in FIG. 8B) and remains constant in a second direction (surface positioned measured along the Z axis in the direction of the Y axis in FIG. 8B). Additionally, each lens element can also have a second lens-element surface 232 that varies in first direction (surface positioned measured along the Z axis in the direction of the X axis in FIG. 8A) and remains constant in the second direction (surface positioned measured along the Z axis in the direction of the Y axis in FIG. 8A). In the particular embodiment shown, each lens element forms a cylindrical lens that extends in the vertical direction. In a variation of the embodiment where each lens element is a cylindrical lens, the first lens-element surface can be defined by a semi-circular shape having a curvature radius between 0.4 and 0.6 mm. In a further variation of this embodiment, the second lens-element surface can be defined by a semi-circular shape having a curvature radius between 1.4 and 1.6 mm. Additionally, in an embodiment, each lens element has a pitch (i.e., center-to-center separation) of 0.4 mm to 0.6 mm.

The second window-portion 228 is configured to propagate a certain (e.g., second) portion of the total illumination light along a fourth path. The portion of the illumination light that is propagated along the fourth path is generally the portion that impinges on the second window-portion 228. In some embodiments, the second window-portion includes a transparent optical material operable to allow light to pass therethrough without substantial interference or alteration. In some embodiments, the second window-portion includes a material operable to alter the illumination beam comprised of the second portion of the total illumination light to predetermined characteristics, where such predetermined characteristics cause the beam formed from the second portion of the total illumination light to be different from the beam formed from the first portion of the total illumination light. It should be apparent that the second window-portion 228 may be positioned in any relation to the first window-portion 226 and may be further comprised or multiple non-contiguous sections. In a preferred embodiment, the area ratio of the first window-portion 226 to the second window-portion 228 is between 3 to 2 and 4 to 1.

Referring back to FIGS. 5A-6B, upon propagating through the window 204, the illumination light is projected in an illumination pattern that is a resulting combination of the first portion of the illumination light passing through the first window-portion 226 and the second portion of the illumination light passing through the second window-portion 228. In some embodiments, the window 204 is configured such that the first window-portion 226 propagates the first portion of the illumination light along a path having a divergence angle of at least 25 degrees along the first plane 218 and a divergence angle of at most 8 degrees along the second plane 220. Additionally, in those embodiments, the window 204 may be configured such that the second window-portion 228 propagates the second portion of the illumination light along a path having a divergence angle of at most 20 degrees along the first plane 218 and a divergence angle of at most 8 degrees along the second plane 220. Alternatively, in those embodiments, the window 204 may be configured such that the second window-portion 228 propagates the second portion of the illumination light along a path having a divergence angle of at most 8 degrees along the first plane 218 and a divergence angle of at most 8 degrees along the second plane 220. In some embodiments, the combination of the lens 202 and the window 204 provides an on-axis gain between 8× and 22×.

Figure 10:
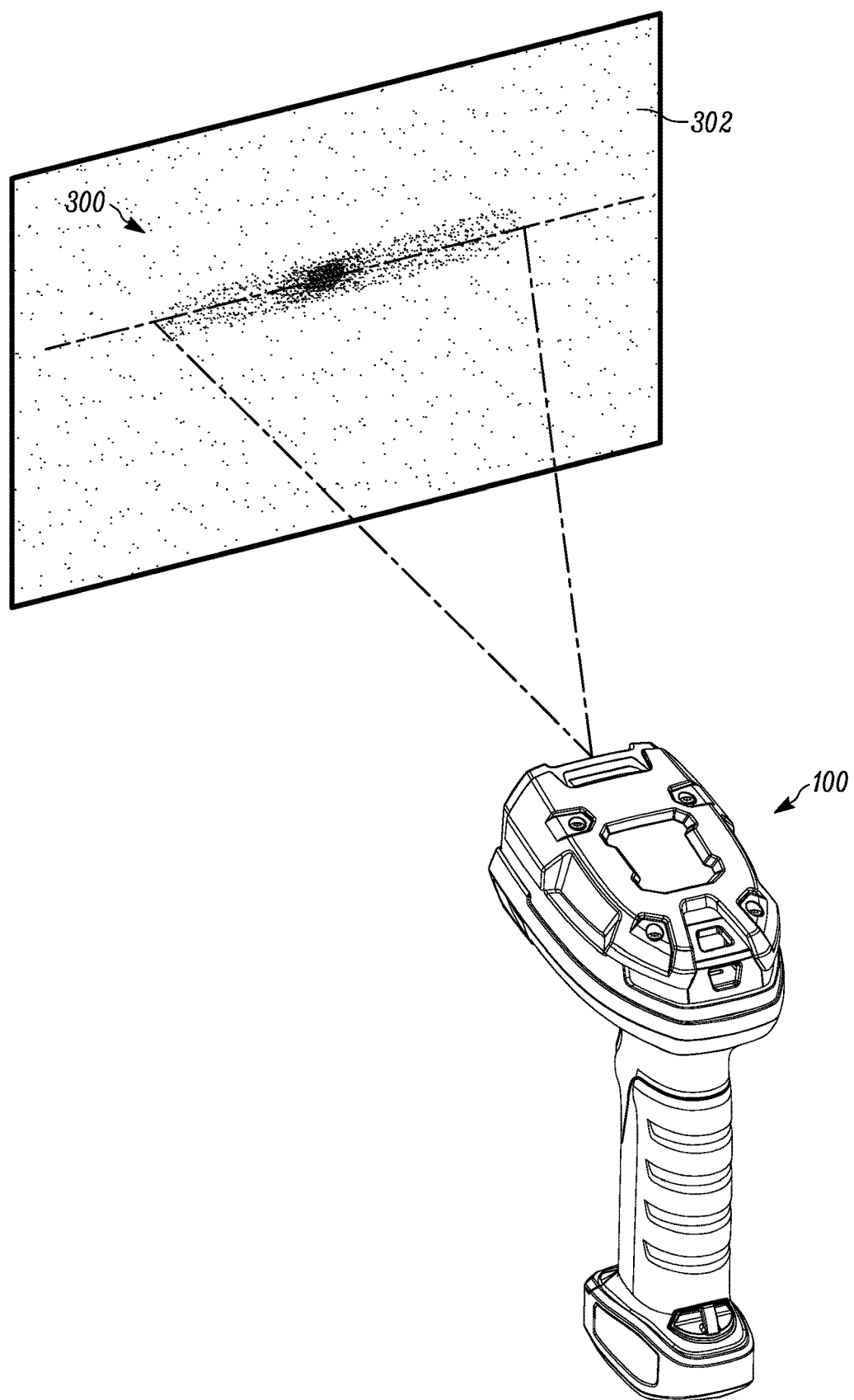
FIG. 10 illustrates an illumination light being projected on a working surface, in accordance with an embodiment of the present invention.
Figure 11:
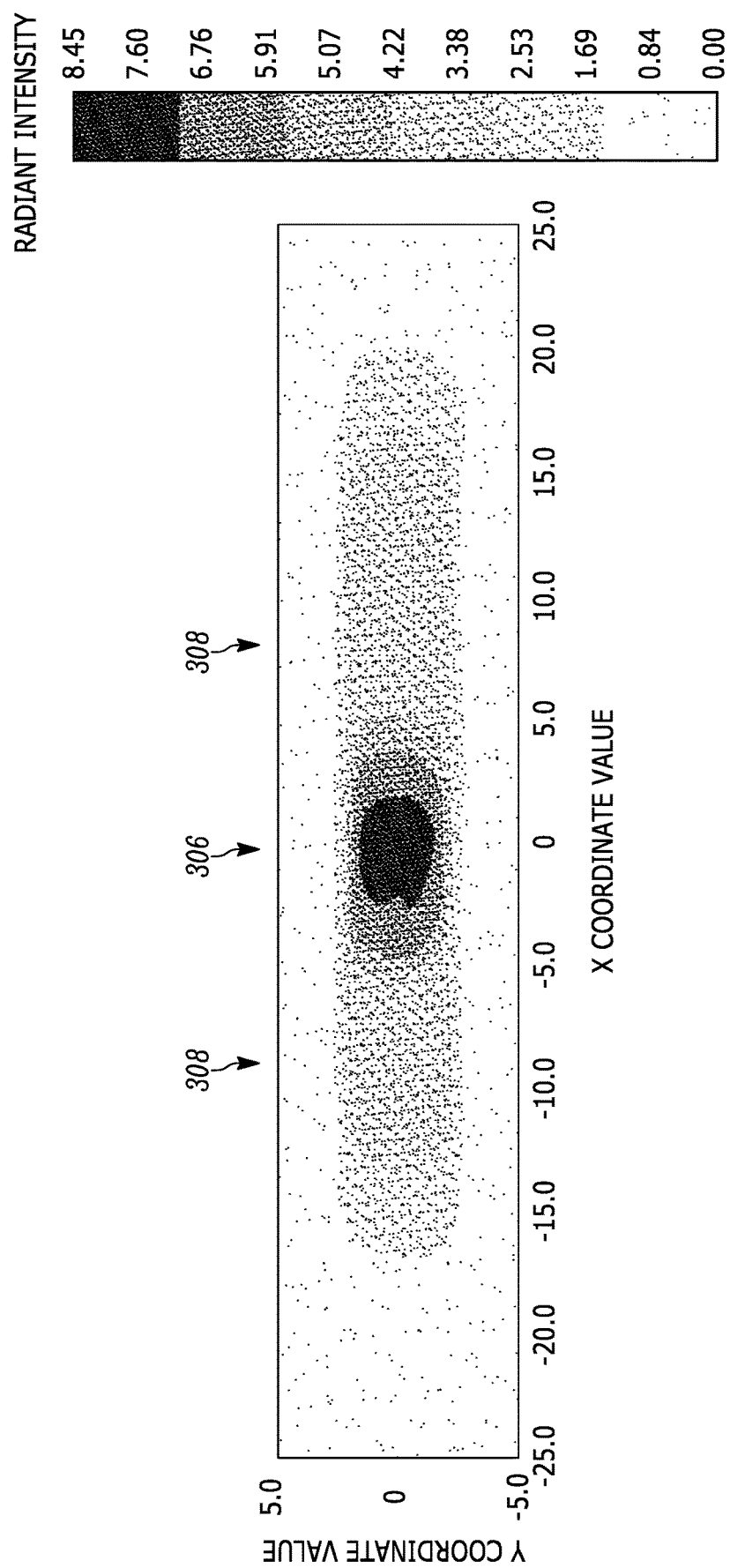
FIG. 11 illustrates the radiant intensity of the illumination light of FIG. 10.
Figure 12:
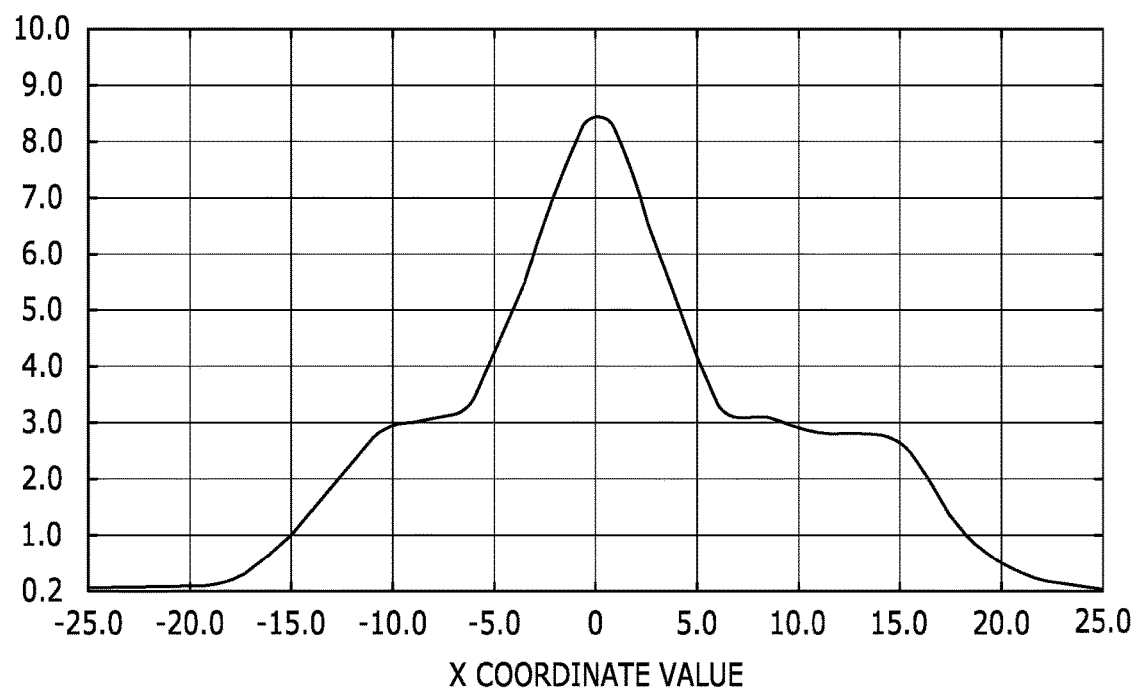
FIG. 12 illustrates the radiant intensity of the illumination light of FIG. 10, as measured along a horizontal, cross-sectional sample.

An exemplary projection of the illumination light 300 is depicted in FIGS. 10-12, where in FIG. 10 the illumination light 300 is illustrated as being projected on a working surface 302, in FIG. 11 the radiant intensity of the illumination light 300 illustrates the divergence of the light, and in FIG. 12 the radiant intensity is plotted as function of angular displacement along a horizontal, cross-sectional sample of the illumination light 300 shown in FIG. 11 (i.e., extending parallel to what may be considered to be the first plane 218). Evaluating the illumination light 300, one may notice that while it has been stretched overall in the horizontal direction such that it extends approximately 15-20 degrees to the right side and 10-20 degrees to the left side, it has also been constrained in the vertical direction such that it extends approximately 2.5 degrees in the upward and downward direction. Additionally, the illumination light 300 is comprised of two primary portions, the relatively brighter portion 306 having a radiant intensity of above 6, and a relatively dimmer portion 308 having a relative intensity below 6 and above 1. Such a pattern is the result of the two, separate window-portions 226, 228 propagating light in a way that causes the second portion of the illumination light that passes through the second window-portion 228 to be superimposed over a section of the first portion of the illumination light that passes through the first window-portion 226. This superimposition of the second portion of the illumination light on the first portion of the illumination light causes the relatively brighter portion 306 which may be particularly useful for the illumination of targets positioned closer to the far working range of a barcode reader. In some embodiments, the illumination light may be configured such that upon the illumination light exiting the window 204, between 50% and 75% of a total amount of radiant intensity of the illumination light 300 is within +/−5 degrees of the central coordinate point (a point that in some embodiments is on the redirected central axis 216). An example of this is illustrated in FIG. 12 where the radiant intensity measurement is taken along a horizontal, cross-sectional sample (e.g., the first plane 218) of the illumination light 300 shown in FIG. 11 with the central X coordinate value corresponding to a point on the redirected central axis 216.

Such an illumination pattern may be particularly useful for illuminating linear barcodes that are to be captured by a linear imager having its FOV overlap with or be subsumed by the light 300, as light energy is concentrated in the area proximate to the FOV. Additionally, when used in barcode readers having multiple imaging assemblies (e.g., FIG. 2) that are operable to capture image data over different working distance ranges (e.g., a far working distance rage and a near working distance range), the narrower divergence and the higher radiant intensity of the relatively brighter portion 306 of the illumination light 300 can serve to sufficiently illuminate targets positioned closer to the far end of the far working distance range. Complementarily, the wider divergence and a still sufficient level of radiant intensity of the relatively dimmer portion 308 combined with the light from the relatively brighter portion 306 serve to appropriately illuminate targets positioned within the near working distance range. Additionally, the relatively dimmer portion 308 produced by the first portion of the illumination light passing through the first window-portion 226 may be steered toward a particular imaging assembly as desired by certain applications. For example, in a multi-imager configuration as described above, it may be advantageous to steer the first portion of the illumination light passing through the first window-portion 226 toward a side occupied by the imaging assembly configured to capture image data over a relatively wide FOV (generally a FOV associated with a near working distance range as opposed to a relatively narrow FOV that is generally associated with a far working distance range).

It should be understood that while the teachings associated with the lens assembly adjustment disclosed herein have been exemplarily presented in connection with linear sensors, they are equally applicable to the adjustment of lens assemblies in connection with other, non-linear (e.g., 2D) imaging sensors. In other words, structures and methods particularly associated with the disclosed lens assemblies and the chasses should not be limited to application with linear imaging sensors, and should instead be understood to extend to applications with other imaging sensors, like 2D imaging sensors which typically have mutually orthogonal arrays of photosensitive elements arranged on a substantially flat surface.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A barcode reader comprising:
an imaging assembly configured to capture images appearing within a field of view; and
an illumination assembly including:
an illumination source operable to emit an illumination light along a first path, the illumination light having a central axis;
a lens positioned within the first path of the illumination light,
the lens configured to redirect the central axis resulting in a redirected central axis and propagate the illumination light along a second path, the central axis and the redirected central axis being non-parallel with respect to each other, the redirected central axis defining a line of intersection between a first plane and a second plane, the first plane being perpendicular to the second plane,
the lens including a first lens surface proximal to the illumination source, the first lens surface being positioned within the first path,
the lens further including a second lens surface distal to the illumination source, the second lens surface being positioned within the second path; and
a window positioned within the second path of the illumination light, the window including a first window-portion and a second window-portion,
the first window-portion being configured to propagate a first portion of the illumination light along a third path, the first portion of the illumination light being a portion of the illumination light that impinges on the first window-portion, the third path having a first divergence angle of at least 25 degrees along the first plane and a second divergence angle that is less than the first divergence angle along the second plane,
the second window-portion configured to propagate a second portion of the illumination light along a fourth path, the second portion of the illumination light being a portion of the illumination light that impinges on the second window-portion, the fourth path having a third divergence angle of at most 20 degrees along the first plane and a fourth divergence angle of at most 8 degrees along the second plane.

2. The barcode reader of claim 1, wherein the first window-portion includes a lens array having a plurality of lens elements, each of the plurality of lens elements having a first lens-element surface that varies in a first direction and remains constant in a second direction, the first direction being parallel with the first plane and the second direction being parallel with the second plane.

3. The barcode reader of claim 2, wherein the first lens-element surface is defined by a semi-circular shape having a curvature radius between 0.4 and 0.6 mm.

4. The barcode reader of claim 2, wherein each of the plurality of lens elements has a pitch of 0.4 mm to 0.6 mm.

5. The barcode reader of claim 2, wherein each of the plurality of lens elements further has a second surface that varies in the first direction and remains constant in the second direction, the second surface being opposite the first surface.

6. The barcode reader of claim 5, wherein the second lens-element surface is defined by a semi-circular shape having a curvature radius between 1.4 and 1.6 mm.

7. The barcode reader of claim 1, wherein a ratio of the first window-portion to the second window-portion is between 3 to 2 and 4 to 1.

8. The barcode reader of claim 1, wherein at least one of the first surface and the second surface is defined by:

$$z(x, y) = \frac{cr^2}{1 + \sqrt{1 - (1+k)c^2r^2}} + \sum_{i,j}^{M,N} A_{ij} E_{ij}(x, y)$$

where:
c is a curvature;
$r^2 = x^2 + y^2$;
k is a conic constant of the at least one of the first surface and the second surface;
M and N are maximum orders of a polynomial;
i and j are running indices indicating an order of the polynomial;
$A_{ij}$ is a coefficient associated with an order of the polynomial;
$E_{ij}$ is a high order polynomial; and
x and y are points on a coordinate plane that is normal to and centered about the redirected central axis.

9. The barcode reader of claim 1, wherein the lens provides an on-axis gain between 25× and 35×.

10. The barcode reader of claim 1, wherein a combination of the lens and the window provides an on-axis gain between 8× and 22×.

11. The barcode reader of claim 1, wherein, upon the illumination light exiting the window, between 50% and 75% of a total amount of radiant intensity of the illumination light is within +/−5 degrees of the redirected central axis, the radiant intensity being measured along a cross-sectional sample extending parallel to the first plane.

12. The barcode reader of claim 1, wherein the lens is a collimating lens.

13. The barcode reader of claim 1, wherein the barcode reader includes a linear imaging assembly having field of view (FOV) that extends along a FOV plane, and wherein the FOV plane is parallel to the first plane.

14. The barcode reader of claim 1, wherein the first lens surface and the second lens surface are arranged such that a first tangential plane that is tangential to the first lens surface along the central axis and a second tangential plane that is tangential to the second lens surface along the redirected central axis intersect at an oblique angle.

15. The barcode reader of claim 14, wherein the oblique angle is between 25 and 40 degrees.

16. A barcode reader comprising:
an imaging assembly configured to capture images appearing within a field of view; and
an illumination assembly including:
an illumination source operable to emit an illumination light along a first path, the illumination light having a central axis;
a lens positioned within the first path of the illumination light,
the lens configured to redirect the central axis resulting in a redirected central axis and propagate the illumination light along a second path, the central axis and the redirected central axis being non-parallel with respect to each other, the redirected central axis defining a line of intersection between a first plane and a second plane, the first plane being perpendicular to the second plane,
the lens including a first lens surface proximal to the illumination source, the first lens surface being positioned within the first path,
the lens further including a second lens surface distal to the illumination source, the second lens surface being positioned within the second path,
wherein the first lens surface and the second lens surface are arranged such that a first tangential plane that is tangential to the first lens surface along the central axis and a second tangential plane that is tangential to the second lens surface along the redirected central axis intersect at an oblique angle; and
a window positioned within the second path of the illumination light, the window including a first window-portion and a second window-portion,
the first window-portion being configured to propagate a first portion of the illumination light along a third path, the first portion of the illumination light being a portion of the illumination light that impinges on the first window-portion, the third path having a first divergence angle along the first plane and a second divergence angle that is less than the first divergence angle along the second plane,
the second window-portion configured to propagate a second portion of the illumination light along a fourth path, the second portion of the illumination light being a portion of the illumination light that impinges on the second window-portion, the fourth path having a third divergence angle along the first plane and a fourth divergence that is less than or equal to the third divergence angle along the second plane.

17. The barcode reader of claim 16, wherein at least one of the first surface and the second surface is defined by:

$$z(x, y) = \frac{cr^2}{1 + \sqrt{1 - (1+k)c^2 r^2}} + \sum_{i,j}^{M,N} A_{ij} E_{ij}(x, y)$$

where:
c is a curvature;
$r^2 = x^2 + y^2$;
k is a conic constant of the at least one of the first surface and the second surface;
M and N are maximum orders of a polynomial;
i and j are running indices indicating an order of the polynomial;
$A_{ij}$ is a coefficient associated with an order of the polynomial;
$E_{ij}$ is a high order polynomial; and
x and y are points on a coordinate plane that is normal to and centered about the redirected central axis.

18. The barcode reader of claim 16, wherein the lens provides an on-axis gain between 25× and 35×.

19. The barcode reader of claim 16, wherein the lens is a collimating lens.

20. The barcode reader of claim 16, wherein the oblique angle is between 25 and 40 degrees.

21. The barcode reader of claim 16, wherein the lens has a height and a width, and wherein a height-to-width ratio is between 1.25 to 1 and 1.75 to 1.

22. A barcode reader comprising:
an imaging assembly configured to capture images appearing within a field of view; and
an illumination assembly including:
an illumination source operable to emit an illumination light along a first path, the illumination light having a central axis;
a lens positioned within the first path of the illumination light,
the lens configured to redirect the central axis resulting in a redirected central axis and propagate the illumination light along a second path, the central axis and the redirected central axis being non-parallel with respect to each other, the redirected central axis defining a line of intersection between a first plane and a second plane, the first plane being perpendicular to the second plane,
the lens including a first lens surface proximal to the illumination source, the first lens surface being positioned within the first path,
the lens further including a second lens surface distal to the illumination source, the second lens surface being positioned within the second path; and
a window positioned within the second path of the illumination light, the window including a first window-portion and a second window-portion,
the first window-portion being configured to propagate a first portion of the illumination light along a third path, the first portion of the illumination light being a portion of the illumination light that impinges on the first window-portion, the third path having a first divergence angle along the first plane and a second divergence angle that is less than the first divergence angle along the second plane, the second window-portion configured to propagate a second portion of the illumination light along a fourth path, the second portion of the illumination light being a portion of the illumination light that impinges on the second window-portion, the fourth path having a third divergence angle along the first plane and a fourth divergence angle that is less than or equal to the third divergence angle along the second plane.

* * * * *